US008903914B2

(12) United States Patent
Paparizos et al.

(10) Patent No.: US 8,903,914 B2
(45) Date of Patent: Dec. 2, 2014

(54) SELECTING USER ACCOUNTS IN SOCIAL NETWORK TO ANSWER QUESTION

(71) Applicant: Microsoft Corporation, Redmond, WA (US)

(72) Inventors: Stelios Paparizos, Mountain View, CA (US); John C. Shafer, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 13/648,291

(22) Filed: Oct. 10, 2012

(65) Prior Publication Data

US 2014/0101267 A1    Apr. 10, 2014

(51) Int. Cl.
*G06F 15/16*        (2006.01)
*G06Q 50/00*        (2012.01)
*H04L 29/08*        (2006.01)

(52) U.S. Cl.
CPC .............. *G06Q 50/01* (2013.01); *H04L 67/22* (2013.01)
USPC .......................................... 709/204; 709/205

(58) Field of Classification Search
CPC ... H04L 67/22; H04L 29/06047; H04L 29/06; H04I 51/046; G06Q 50/01
USPC .......................... 709/200–205, 217–227, 228
See application file for complete search history.

(56) References Cited

U.S. PATENT DOCUMENTS

| 7,853,881 | B1 * | 12/2010 | Aly Assal et al. ............. 715/734 |
| 8,055,675 | B2 * | 11/2011 | Higgins et al. ................ 707/769 |
| 8,073,794 | B2 | 12/2011 | Amer-Yahia et al. |
| 8,412,770 | B2 * | 4/2013 | Marcucci et al. ............. 709/204 |
| 8,515,888 | B2 * | 8/2013 | Ventilla et al. ................... 706/45 |
| 8,516,379 | B2 * | 8/2013 | D'Angelo et al. ............. 715/751 |
| 8,522,152 | B2 * | 8/2013 | Baldwin et al. ............... 715/751 |
| 8,595,297 | B2 * | 11/2013 | Marcucci et al. ............. 709/204 |
| 8,650,497 | B2 * | 2/2014 | Baldwin et al. ............... 715/753 |
| 2008/0189122 | A1 | 8/2008 | Coletrane et al. |
| 2008/0189623 | A1 * | 8/2008 | Patil ............................. 715/753 |

(Continued)

OTHER PUBLICATIONS

Amershi et al., "ReGroup: Interactive Machine Learning for On-Demand Group Creation in Social Networks", Retrieved at <<http://www.cs.washington.edu/ai/pubs/amershiCHI2012_ReGroup.pdf>>, Conference on Human Factors in Computing Systems, CHI '12, Austin, TX, USA, May 5, 2012, pp. 10.

(Continued)

*Primary Examiner* — Moustafa M Meky
(74) *Attorney, Agent, or Firm* — Micah Goldsmith; Leonard Smith; Micky Minhas

(57) ABSTRACT

Messages generated by user accounts in a social networking application over a period of time are processed to determine the subjects and topic associated with the messages, as well as the geographical locations of the users associated with the user accounts, and the times when the users associated with the accounts are most active. The determined, subject, time, and location information is used to create a model that may be used to predict whether a user in the social networking application is willing, available, and has the knowledge or topical affinity to answer a question proposed by another user in the social networking application based on a subject, time, and/or location associated with the question. When a user enters a question, the user may be presented with a list of their friends or contacts ranked according to the probabilities generated by the model.

17 Claims, 5 Drawing Sheets

(56) References Cited

U.S. PATENT DOCUMENTS

| | | | |
|---|---|---|---|
| 2010/0145976 A1* | 6/2010 | Higgins et al. | 707/765 |
| 2011/0106746 A1* | 5/2011 | Ventilla et al. | 706/50 |
| 2011/0106895 A1* | 5/2011 | Ventilla et al. | 709/206 |
| 2011/0196923 A1* | 8/2011 | Marcucci et al. | 709/204 |
| 2011/0276882 A1 | 11/2011 | Buehler et al. | |
| 2012/0030734 A1 | 2/2012 | Wohlert | |
| 2012/0041907 A1 | 2/2012 | Wang et al. | |
| 2012/0078938 A1* | 3/2012 | Davis et al. | 707/767 |
| 2013/0139070 A1* | 5/2013 | Baldwin et al. | 715/753 |
| 2013/0173725 A1* | 7/2013 | Ventilla et al. | 709/206 |

OTHER PUBLICATIONS

Greg, Kumparak, "Facebook Begins Auto-Grouping Friends into Smart Lists", Retrieved at <<http://techcrunch.com/2011/09/08/facebook-begins-auto-grouping-colleagues-school-mates-and-local-friends-into-smart-lists/>>, Sep. 8, 2011, pp. 2.

Boix et al.,"Flocks: Enabling Dynamic Group Interactions in Mobile Social Networking Applications", Retrieved at <<http://soft.vub.ac.be/Publications/2010/vub-tr-soft-10-20.pdf>>, In Proceedings of the ACM Symposium on Applied Computing, Mar. 21, 2011, pp. 8.

Grob et al., "Cluestr: Mobile Social Networking for Enhanced Group Communication", Retrieved at <<http://distcomp.ethz.ch/publications/group09.pdf>>, In Proceedings of the ACM International Conference on Supporting Group Work, May 10, 2009, pp. 10.

Horowitz et al.,"The Anatomy of a Large-Scale Social Search Engine", Retrieved at <<http://www.ra.ethz.ch/cdstore/www2010/www/p431.pdf>>, In Proceedings of the 19th International Conference on World Wide Web, Apr. 26, 2010, pp. 10.

Lin et al.,"Small Blue: Social Network Analysis for Expertise Search and Collective Intelligence", Retrieved at <<http://www.cse.ust.hk/~nancao/pubs/lin_icde09_paper.pdf>>, In IEEE 25th International Conference on Data Engineering, Mar. 29, 2009, pp. 4.

Lubke et al., "MobilisGroups: Location-based Group Formation in Mobile Social Networks", Retrieved at <<http://ieeexplore.ieee.org/stamp/stamp.jsp?tp=&arnumber=5766941>>, In IEEE International Conference on Pervasive Computing and Communications Workshops, Mar. 21, 2011, pp. 6.

Morris et al., "What Do People Ask Their Social Networks, and Why? A Survey Study of Status Message Q&A Behavior", Retrieved at <<http://citeseerx.ist.psu.edu/viewdoc/download?doi=10.1.1.157.5360&rep=rep1&type=pdf>>, In Proceedings of the 28th International Conference on Human Factors in Computing Systems, Apr. 10, 2010, pp. 10.

Paul et al.,"Is Twitter a Good Place for Asking Questions? A Characterization Study", Retrieved at <<http://www.personal.psu.edu/sap246/spaul_ICWSM11_poster_Final.pdf>>, In Fifth International AAAI Conference on Weblogs and Social Media, Jul. 17, 2011, pp. 4.

Arb et al.,"VENETA: Serverless Friend-of-Friend Detection in Mobile Social Networking", Retrieved at <<http://ieeexplore.ieee.org/stamp/stamp.jsp?tp=&arnumber=4654233>>, In Proceedings of the IEEE International Conference on Wireless & Mobile Computing, Networking & Communication, Oct. 12, 2008, pp. 6.

White et al.,"Effects of Community Size and Contact Rate in Synchronous Social Q&A", Retrieved at <<http://research.microsoft.com/en-us/um/people/ryenw/papers/whitechi2011.pdf>>, In Proceedings of the Annual Conference on Human Factors in Computing Systems, May 7, 2011, pp. 10.

Yimam-Seid et al.,"Expert Finding Systems for Organizations: Problem and Domain Analysis and the DEMOIR Approach", Retrieved at http://www.ics.uci.edu/~kobsa/papers/2003-JOCEC-kobsa.pdf>>, In Journal of Organizational Computing and Electronic Commerce, vol. 13, Issue 1, Jul. 4, 2012, pp. 23.

Jones et al."A probabilistic model of information retrieval: development and comparative experiments", Retrieved at http://www.soi.city.ac.uk/~ser/blockbuster/pmir-pt1-reprint.pdf>>, Information Processing and Management, Jan. 2000, pp. 779-808.

Jones et al."A probabilistic model of information retrieval: development and comparative experiments", Retrieved at <<http://www.marilia.unesp.br/Home/Instituicao/Docentes/EdbertoFerneda/MRI%2005%20%20Robertson,%20KS%3B%20Walker,%20S%3B%20Jones,%20KS%20-%202000.pdf>>, Information Processing and Management, Jan. 2000, pp. 809-840.

* cited by examiner

SELECTING USER ACCOUNTS IN SOCIAL NETWORK TO ANSWER QUESTION

BACKGROUND

People often turn to their social networks, such as Facebook, Twitter, and Skype, to fulfill their information needs. For example, when a user associated with a user account in the social network has a question, the user may send a question to one or more friends or contacts in the social network to find an answer. With the average user account having numerous friends, finding which friends to engage can be challenging.

One solution is to publicly broadcast a question to the entire network. At first this seems to allow a user to reach a broader audience and increase the chances of getting a good response. However, it runs the danger of irritating the user's friends when done too often or for a topic that does not interest most people. Furthermore, such an undirected request may easily be lost amongst many other postings, thus leading to potentially content-free responses by friends who are eager or feel compelled to respond, yet who are not very knowledgeable on the topic or have little time to compose more than a cursory message. Finally, public broadcast may also be inappropriate if the topic is sensitive (e.g., advice on a medical condition).

Direct messaging avoids those pitfalls, but presents other problems. It may be time-consuming to think of who to engage with, and choosing poorly risks missing out on relevant and timely responses. Users may not have good insight into who is knowledgeable about a topic, especially if they have never discussed the topic in the past. Users may also not know whether friends are likely to respond, whether due to their willingness to engage or their current availability.

SUMMARY

Messages generated by user accounts in a social networking application over a period of time are processed to determine the subjects and topics associated with the messages, as well as the geographical locations of the users associated with the user accounts, and the times when the users associated with the accounts are most active. Such data is added to the messages as metadata. The determined subject, time, and location information is used to create a model that may be used to predict whether a user in the social networking application is willing, available, and has the knowledge or topical affinity to answer a question proposed by another user in the social networking application based on a subject, time, and location associated with the question. When a user enters a question, the user may be presented with a list of their friends or contacts ranked according to the probabilities generated by the model.

In an implementation, user account identifiers are received by a computing device. Messages are received by the computing device. Each message is associated with a user account by the computing device. A question is received by the computing device. A subset of the user account identifiers is determined by the computing device based on the messages associated with the user accounts and the question. The determined subset is provided by the computing device.

In an implementation, messages are received by a computing device. Each message is associated with a user account. A recommendation model is generated based on the messages by the computing device. A question is received by the computing device. Based on the received question and the generated recommendation model, one or more user accounts are recommended to answer the received question by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
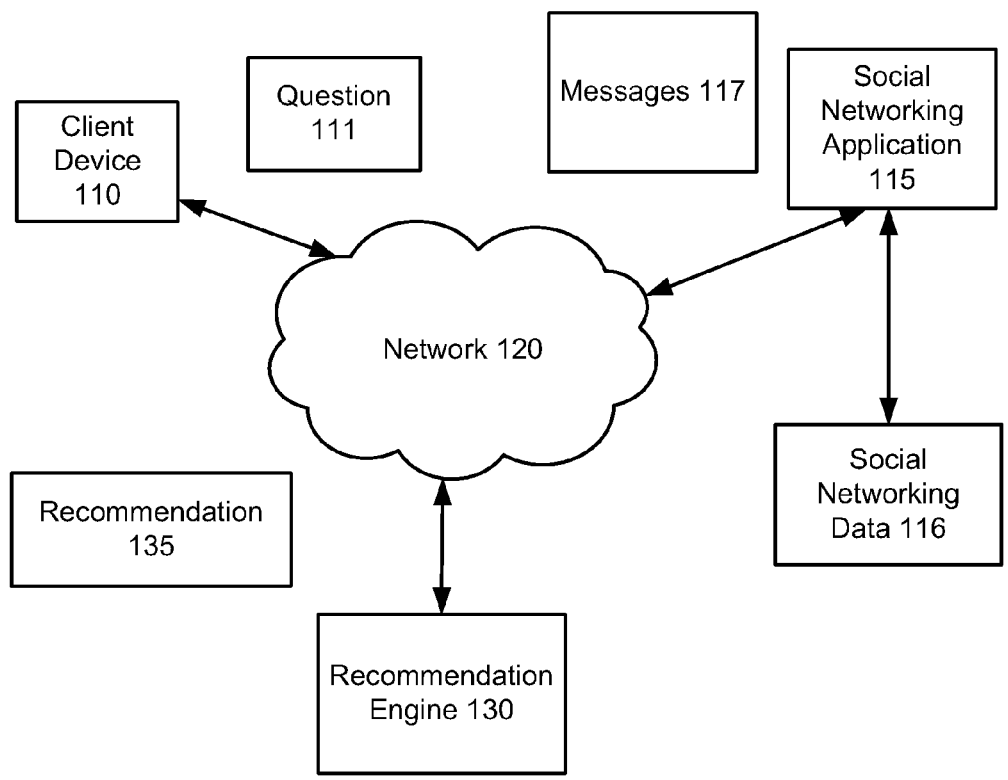
FIG. 1 is an illustration of an example environment for recommending user accounts to answer a question.

FIG. 1 is an illustration of an example environment 100 for recommending user accounts to answer a question. The environment 100 may include a client device 110, a social networking application 115, and a recommendation engine 130 in communication with one another through a network 120. The network 120 may be a variety of network types including the public switched telephone network (PSTN), a cellular telephone network, and a packet switched network (e.g., the Internet). Although shown as comprised within separate devices over the network 120, depending on the implementation, the client device 110 and the recommendation engine 130 may be comprised within a single computing device, or one or more other computing devices that may or may not communicate over the network 120.

In some implementations, the client device 110 may include a desktop personal computer, workstation, laptop, PDA (personal digital assistant), smart phone, cell phone, or any WAP (wireless application protocol) enabled device or any other computing device capable of interfacing directly or indirectly with the network 120. A client device 110 may be implemented using a general purpose computing device such as the computing device 500 described with respect to FIG. 5, for example. While only one client device 110 is shown, it is for illustrative purposes only; multiple client devices may be supported.

The social networking application 115 may provide social networking functionality through user accounts associated with the social networking application 115. A user may access one or more features or services provided by a user account of the social networking application 115 using a client device 110 associated with the user.

In some implementations, each user may have a user account in the social networking application 115. The user may establish social networking relationships with one or more other user accounts of the social networking application 115. The social networking relationships may include a friend based relationship where the user and one or more other users are able to share messages, view profile information associated with one another, post public messages on walls associated with each other, and recommend or endorse documents, for example. Other well-known social networking relationships may also be supported by the social networking application 115.

The social networking application 115 may store and/or access social networking data 116. In some implementations, the social networking data 116 may include an identifier of each user account, and identifiers of the various social networking relationships between the user accounts. The social networking data 116 may further include other information such as times and locations from which the users access their user accounts in the social networking application 115, as well as user provided profile information such as likes, dislikes, schools attended, subjects studied, etc.

The strength of the social networking relationship between two user accounts is referred to herein as "social affinity". For example, if two user accounts exchange a large number of messages in the social networking application 115, then the user accounts may have a high social affinity. Similarly, if two user accounts rarely exchange messages, or if one of the user accounts sends messages that are not often responded to by the other user account, then the user accounts may have a low social affinity. While the number of interactions between user accounts may be a good indicator of social affinity, other indicators of social affinity may include geographical proximity or physical proximity. For example, if two users live or work close together in the real world, they may be more likely to friends than two users who live or work far apart.

A user of the client device 110 with a user account in the social networking application 115 may want to ask one or more other users in the social networking application 115 a question 111. The question 111 may include a variety of question types and may be associated with a variety of subjects. Example questions may include "Where should I have dinner tonight?", "What movies in the theater are good now?", and "Can someone help me with a math question?". Any type of questions may be supported.

Users may not want to send the question 111 to each user account that they are friends with, or have a social networking relationship with, in the social networking application 115. The user may either be embarrassed by the question 111, may not wish to bother all of their friends, or the question 111 may only be germane to a small subset of their friends.

Accordingly, in some implementations, the environment 100 may include the recommendation engine 130. The recommendation engine 130 may receive the question 111, may generate a recommendation 135 based on the received question 111, and may provide the recommendation 135 to the user at the client device 110. In some implementations, the recommendation 135 may identify a subset of the user accounts in the social networking application 115 that are likely to have the knowledge to answer the question 111, that may be willing to answer the question 111, and that are likely to be available to answer the question 111. Put another way, the recommendation 135 may identify those user accounts that are associated with users that are likely to be ready, available, and have the requisite knowledge or topical affinity to answer the question 111.

Figure 2:
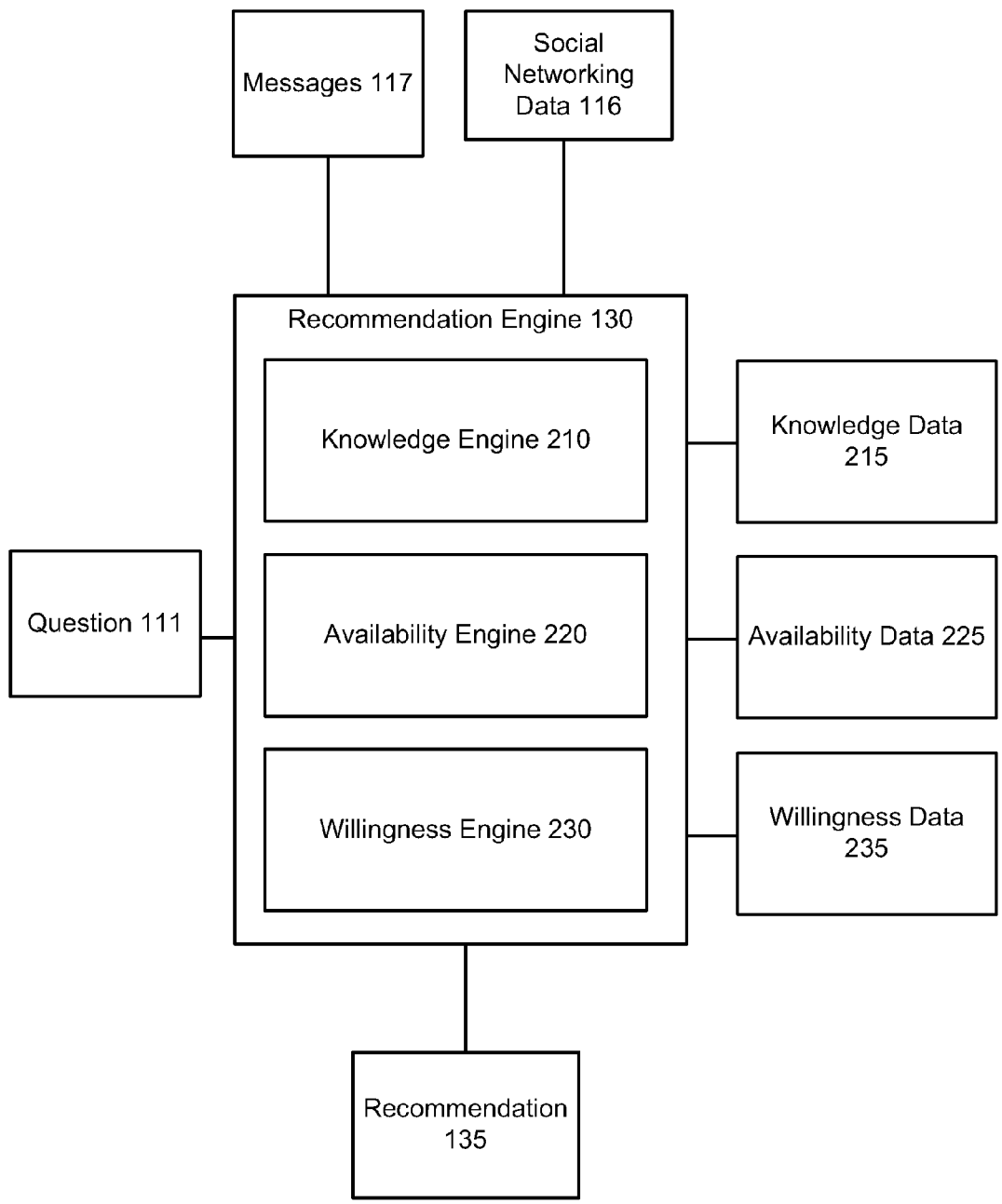
FIG. 2 is an illustration of an example recommendation engine.

As described further with respect to FIG. 2, the recommendation engine 130 may determine the recommendation 135 based on messages 117 associated with the social networking application 115. The messages 117 may be the messages, such as wall posts, that are generated by the user accounts in the social networking application 115. Each message 117 may include a time and date when the message was generated, as well as a location from where the message 117 was generated. The location may be a GPS coordinate, or a more general location such as a country, state, city, street address or name of a business, for example. The location may be the location of the client device 110 that the user associated with the user account used to generate the message 117. The location and time associated with the messages 117 may be used by the recommendation engine 130 to determine user accounts of users that are willing and/or available to answer a question 111. The various subjects and topics discussed by the messages 117 may also be determined by the recommendation engine 130, and used to further determine user accounts of users that are likely to be interested in, or knowledgeable about, a subject associated with the question 111.

The recommendation engine 130 may further generate the recommendation 135 using the social networking data 116. In particular, the social networking data 116 (along with the messages 117) may be used by the recommendation engine 130 to determine the social affinity of the user accounts with respect to each other, and may be used by the recommendation engine 130 to determine users that are willing and/or available to answer a question 111. Moreover, time and/or location information from the social networking data 116 may be used by the recommendation engine 130 to further determine users that are willing and/or available to answer a question 111.

In order to ensure the privacy of the user accounts, in some implementations, the social networking data 116 and/or messages 117 associated with a user account may only be provided to the recommendation engine 130 if the user associated with the user account "opts in" or otherwise consents to the use of their information. Alternatively or additionally, depending on the social networking application 115, only public or unprotected messages 117 associated with a user account may be provided to the recommendation engine 130 by the social networking application 115.

FIG. 2 is an illustration of an example recommendation engine 130. As illustrated, the recommendation engine 130 includes a knowledge engine 210, an availability engine 220, and a willingness engine 230. More or fewer components may be supported by the recommendation engine 130. The recommendation engine 130 be implemented using a general purpose computing device such as the computing device 500 described with respect to FIG. 5, for example. Alternatively or additionally, the recommendation engine 130 may be implemented as part of the client device 110 or social networking application 115, for example.

The knowledge engine 210 may use the messages 117 and/or the social networking data 116 to generate knowledge data 215 regarding each user account in the social networking application 115. The knowledge data 215 may comprise a list of subjects that the user associated with a user account has shown interest in, or is otherwise associated with. Each subject may also have a number or some indication of the degree or amount of interest that the user has in the subject.

With respect to the messages 117, the knowledge engine 210 may generate the knowledge data 215 for each user account by processing each message 117 associated with the user account and extracting various keywords or phrases known to be associated with one or more subjects from the text of the messages 117. Subjects associated with keywords or phrases that occur in more than a threshold number, or threshold percentage, of the messages 117 may be added to the knowledge data 215. Any system, method, or technique for identifying subjects of messages may be used. For example, tokenizers or stemmers may be used to determine the subjects from the text of the messages 117.

With respect to the social networking data 116, the knowledge engine 210 may similarly extract keywords or phrases known to be associated with one or more subjects from the social networking data 116. The keywords and phrases may be extracted from the user generated profile, location history (i.e., "check-ins"), text associated with any "likes" generated by the users or other indicators of interest supported by the social networking application 115, indicators of games played or other media consumed by the user through the social networking application, etc. Extracted keywords or phrases may be similarly added to the knowledge data 215 by the knowledge engine 210.

Because the subject information from the social networking data 116 (especially user profile information) is heavily curated by users, or incomplete or outdated, the information may be less reliable than the information learned from the messages 117. Therefore, in some implementation, the social networking data 116 may be weighted less than the messages 117 for purposed of generating the knowledge data 215.

The knowledge data 215 may be used to generate a knowledge model that receives an identifier of a user account in the social networking application 115 and a subject, and outputs a probability that the user associated with the identified user account is knowledgeable or interested in the subject. Any system, method or technique for generating a model may be used. In some implementations, the knowledge model may comprise an inverted text index generated from the text, or extracted keywords, of the messages 117.

The availability engine 220 may use the messages 117 and/or the social networking data 116 to generate availability data 225 for each of the user accounts in the social networking application 115. With respect to the messages 117, each message 117 may be associated with a time that the message 117 was generated. The time may further include the day of the week that the message 117 was generated. The availability engine 220 may store the time associated with each message 117 in the availability data 225.

With respect to the social networking data 116, the data 116 may include the times (and days of the week) associated with each login or use of the social networking application 115 for each user account. The availability engine 220 may store the times for the social networking data 116 associated with each user account in the availability data 225.

In some implementations, the availability engine 220 may determine location information from the messages 117 and/or social networking data 116. With respect to the messages 117, the location information may be the location that the message 117 was generated from. The location information may be GPS coordinates, or names of cities, states, and countries, for example. With respect to the social networking data 116, the location information may be the locations from which users accessed the social networking application 115.

The availability data 225 may be used to generate an availability model that receives an identifier of a user account in the social networking application 115, a location, and a time (e.g., day of the week and time of day), and outputs a probability that the user associated with the identified user account is available to answer a question 111. Any system, method, or technique for generating a model may be used.

The willingness engine 230 may use the messages 117 and/or the social networking data 116 to generate willingness data 235 for each of the user accounts in the social networking application 115. With respect to the messages 117, the messages 117 may be used to determine the social affinity between user account pairs in the social networking application 115. In some implementations, the social affinity between user accounts pairs may be determined by the willingness engine 230 based on the number of messages exchanged between the user accounts in the pair. Generally the greater the number of messages 117, the higher the determined social affinity. The determined social affinity data may be stored by the willingness engine 230 as the willingness data 235.

With respect to the social networking data 116, the data 116 may include indications of which users accounts have social networking relationships (i.e., are friends). Theses social networking relationships may be used by the willingness engine 230 to determine the social affinity of user account pairs.

In some implementations, the willingness engine 230 may also determine location information from the messages 117 and/or social networking data 116. The location information may be determined similarly as described above for the availability engine 220. In general, a user associated with a user account may be more willing to answer a question from a user associated with another user account when the users are located close together. For example, a user may be more likely to answer a question 111 from a coworker or neighbor than other users. The location information may be added to the willingness data 235 by the willingness engine 230.

In some implementations, the willingness engine 230 may also determine subjects from the messages 117 and/or social networking data 116. The subjects may be determined similarly as described above for the knowledge engine 210. In general, some users may be more willing to answer questions 111 relating to certain subjects or topics than others. For example, a user may respond more quickly to messages 117 having to do with movies than messages 117 having to do with restaurant advice. The subjects may be added to the willingness data 235 by the willingness engine 230.

The willingness data 235 may be used to generate a willingness model that receives an indicator of a first user account and a second user account in the social networking application 115, a location, and a subject, and outputs a probability that the first user is willing to answer a question 111 sent by the second user. Any system, method, or technique for generating a model may be used.

The recommendation engine 130 may receive a question 111 from a user associated with a user account in the social networking application 115, and may use the knowledge data 215, availability data 225, and willingness data 235 to determine a recommendation 135 based on the question 111. The recommendation 135 may include a subset of user accounts from the social networking application 115 ranked by the probability that the users associated with the user accounts in the subset are ready, willing, and available to answer the question 111.

In some implementations, the recommendation engine 130 may determine the recommendation 135 for a received question by determining one or more of time, subject, or location information associated with the question 111. The time may include a time of day and a day of the week and may be the time that the question 111 was generated, or that the question 111 is received by the recommendation engine 130. The location may be the location of the client device 110 associated with the user that provided the question 111.

With respect to the subject, in some implementations, the recommendation engine 130 may determine the subject by searching for one more keywords or phrases in the text of the question 111. Similarly as described with respect to the knowledge engine 210, the recommendation engine 130 may determine one or more subjects of the question 111 using one or more tokenizers or stemmers, for example. Other methods for determining the subject of a text string may be used.

The recommendation engine 130 may use one or more of the generated recommendation models (i.e., the knowledge model, the availability model, or the willingness model) to select a subset of the user accounts from the social networking application 115 to answer the question 111. In some implementations, the recommendation engine 130 may calculate a probability for each user account in the social networking application 115 (or just the user accounts that are friends with the user account associated with the question 111) using each of the recommendation models. The overall probability for a user account may then be determined using Bayes rule as the product of the three probability calculations. The user accounts may be ranked by the overall probabilities, and the recommendation engine 130 may select the top ranked user accounts as the recommendation 135. The recommendation 135 may be provided to the user associated with the question 111.

In some implementations, when none of the user accounts identified by the recommendation 135 has a high probability, or are less than a threshold probability, the recommendation 135 may further include information or advice on how the user can improve the probability that their question 111 will be answered. For example, the recommendation engine 130 may use the availability data 225 to determine times where more user accounts are likely to be available. The recommendation engine 130 may suggest to the user that the user wait until the determined times to send the question 111.

Figure 3:
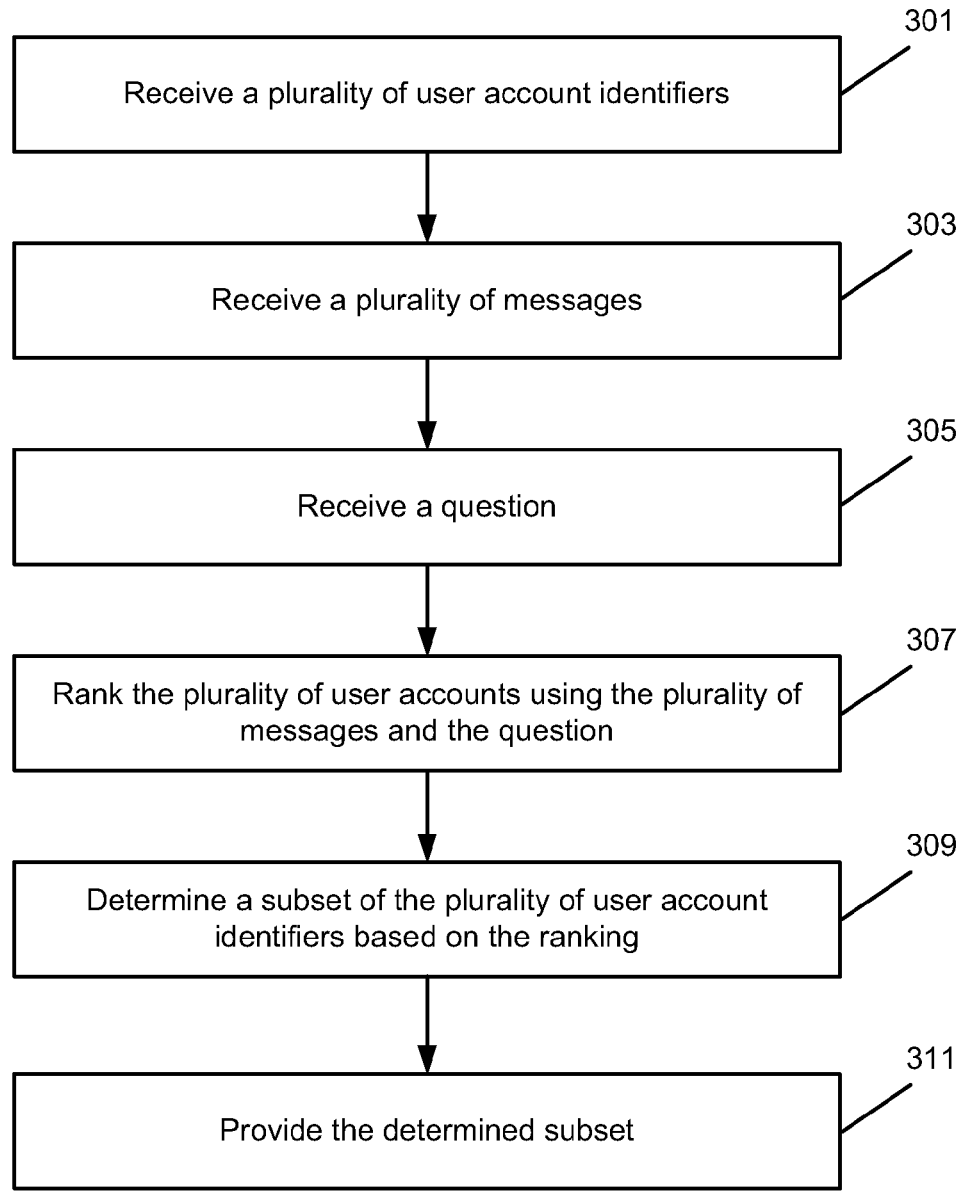
FIG. 3 is an operational flow of an implementation of a method for determining user accounts to answer a question.

FIG. 3 is an operational flow of an implementation of a method 300 for determining user accounts to answer a question 111. The method 300 may be implemented by the recommendation engine 130, for example.

A plurality of user account identifiers is received at 301. The user account identifiers may be received by the recommendation engine 130 from the social networking application 115. The user account identifiers may identify user accounts in the social networking application 115.

A plurality of messages is received at 303. The plurality of messages 117 may be received by the recommendation engine 130 from the social networking application 115. Each message of the plurality of messages may have been generated by a user associated with an identified user account. Each message may be associated with a location and a time. The time associated with a message may be the time and day of the week that the message was generated. The location of the message may be the location that the user associated with the user account was located in when the message was generated.

A question is received at 305. The question 111 may be received by the recommendation engine 130 from a user of the client device 110. The user may have a user account in the social networking application 115. The user may wish to learn which of the other users with user accounts in the social networking application 115 may be likely to answer the question 111. Accordingly, the user has provided the question 111 to the recommendation engine 130. The question 111 may have a subject (i.e., what the question 111 is about), as well as a time and a location. The time may be the current time and day of the week, and the location may be the geographical location of the user (or the client device 110 associated with the user).

In some implementations, rather than provide the question 111 to the recommendation engine 130, the user may provide the subject(s) of the question 111 to the recommendation engine 130. For example, the user may select one or more subjects from a drop-down menu provided by the recommendation engine 130 through the client device 110. Other user interface elements may be used.

The plurality of user accounts is ranked using the plurality of messages and the received question at 307. The plurality of user accounts may be ranked by the recommendation engine 130. In some implementations, the plurality of user accounts may be ranked using one or more recommendation models such as the knowledge model, the availability model, and the willingness model. The models may have been generated by the recommendation engine 130 using the messages 117. The models may take as inputs one or more of the location, time, or subject of the received question 111, and may output a probability for each identified user account that the user associated with the user account is ready, willing, or able to answer the received question 111. The user accounts may be ranked based on the determined probabilities. In some implementations, the ranked user accounts may be limited to those user accounts that the user who provided the question 111 has a social networking relationship with (i.e., is friends with).

A subset of the plurality of user account identifiers is determined at 309. The subset of the plurality of user accounts may be determined by the recommendation engine 130 based on the rankings. The recommendation engine 130 may determine the identifiers of the top ranked user accounts as the recommendations 135.

The determined subset is provided at 311. The determined subset of user account identifiers may be provided by the recommendation engine 130 to the user that provided the question 111. In some implementations, the determined subset of user account identifiers may be displayed to the user at the client device 110, along with the probabilities generated by one or more of the knowledge model, willingness model, and availability model. The user may select one or more of the identified user accounts to receive the question 111.

Figure 4:
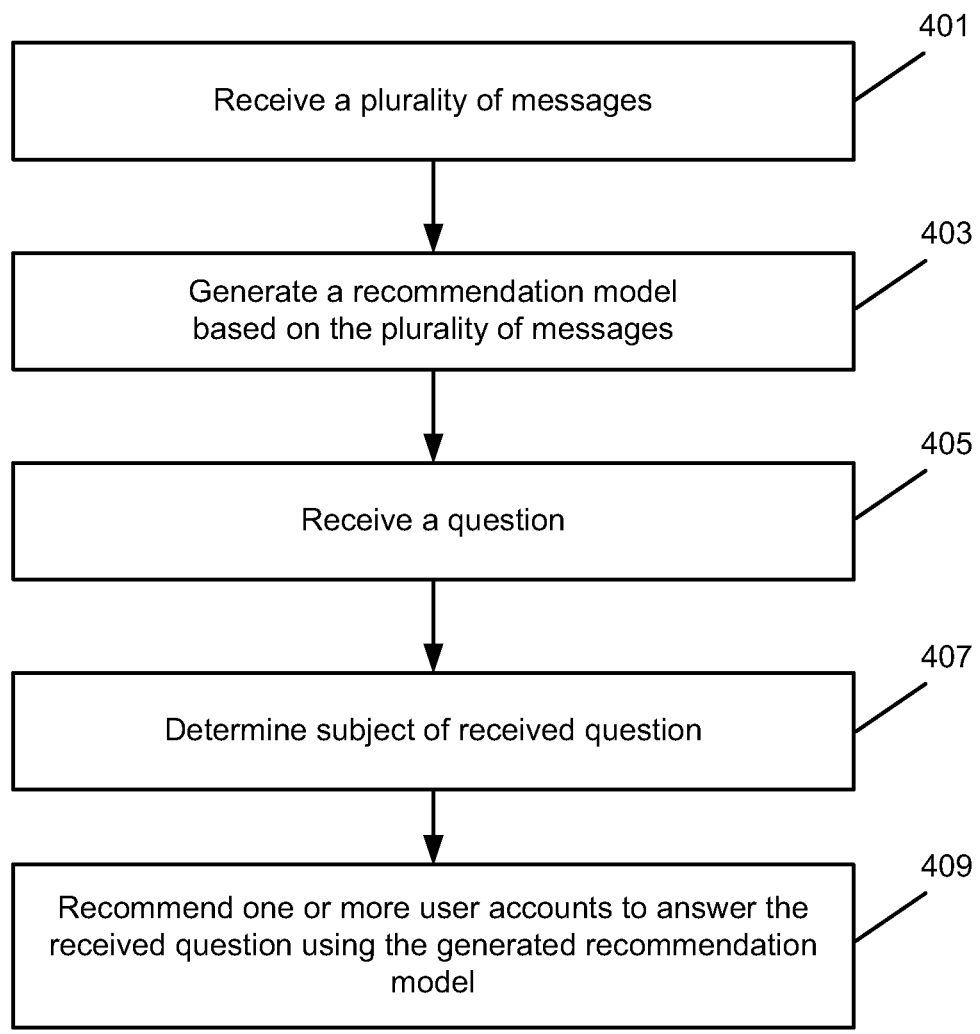
FIG. 4 is an operational flow of an implementation of a method for recommending user accounts to answer a question using one or more recommendation models.

FIG. 4 is an operational flow of an implementation of a method 400 for recommending user accounts to answer a question using one or more recommendation models. The method 400 may be implemented by the recommendation engine 130.

A plurality of messages is received at 401. The plurality of messages 117 may be received by the recommendation engine 130 from the social networking application 115. The messages 117 may be messages that were generated by users using user accounts in the social networking application 115. Each message 117 may have an associated subject, location, and time. In some implementations, the recommendation engine 130 may also receive social networking data 116 from the social networking application 115.

A recommendation model is generated based on the plurality of messages at 403. The recommendation model may be generated by the recommendation engine 130 based on the plurality of messages and/or the social networking data 116. In some implementations, the recommendation model may include one or more of a knowledge model, an availability model, and a willingness model.

With respect to the knowledge model, the model may take as an input an identifier of a user account in the social networking application and a subject, and may generate a probability that a user associated with the identified user account is knowledgeable or interested in the subject. The term knowledge as used herein may be a measure of how close a user is to a particular subject, and may include the topical affinity of the user to the subject. The knowledge model may be generated by the knowledge engine 210 of the recommendation engine 130 by determining subjects of each of the messages 117, and associating the determined subjects with the user accounts that generated the corresponding messages 117.

With respect to the availability model, the model may take as an input an identifier of a user account in the social networking application, a time, and a location, and may generate a probability that a user associated with the identified user account is available. The availability model may be generated by the availability engine 220 of the recommendation engine 130 by determining the time and location associated with each of the messages 117, and associating the determined times and locations with the user accounts that generated the corresponding messages.

With respect to the willingness model, the model may take as an input an identifier of a first user account and a second user in the social networking application 115, and a location, and may generate a probability that a user associated with the first user account is willing to answer a question 111 associated with the second user account. In some implementations, the willingness model may also take as an input a subject. The willingness model may be generated by the willingness engine 230 of the recommendation engine 130 by determining the social affinities between the user accounts based on the messages 117, along with the locations associated with each user account, and using the determined social affinities and locations to generate the model. Social affinity may be a measure of the strength of the social networking relationship between two user accounts, and may be determined based on the number of messages 117 exchanged between the two user accounts.

A question is received at 405. The question 111 may be received by the recommendation engine 130 from the client device 110. The question 111 may have a subject, and may be associated with a time and/or a location. The time may be the time that the question 111 is provided to the recommendation engine 130 or may be a time that the user specified that the question 111 would be sent to another user in the social networking application 115. The location may be a location of the user that generated the question 111 or the location of the client device 110 operated by the user.

A subject of the received question is determined at 407. The subject of the received question 111 may be determined by the recommendation engine 130. In some implementations, the subject may be determined by parsing the question 111 for one or more keywords or phrases that may be indicative of the subject. Any system, method, or technique for determining a subject or topic from a text string may be used.

One or more user accounts are recommended to answer the question at 409. The one or more user accounts may be determined by the recommendation model based on the recommendation model, the subject of the question 111, the time associated with the question 111, and the location associated with the question 111. In some implementations, the recommendation model 130 may, for each user account, determine a probability for that user account using each of the availability, willingness, and knowledge models, and may select the user accounts with the greatest determined probabilities. Identifiers of the selected user accounts may be provided to the user that provided the question 111 as the recommendation 135.

Figure 5:
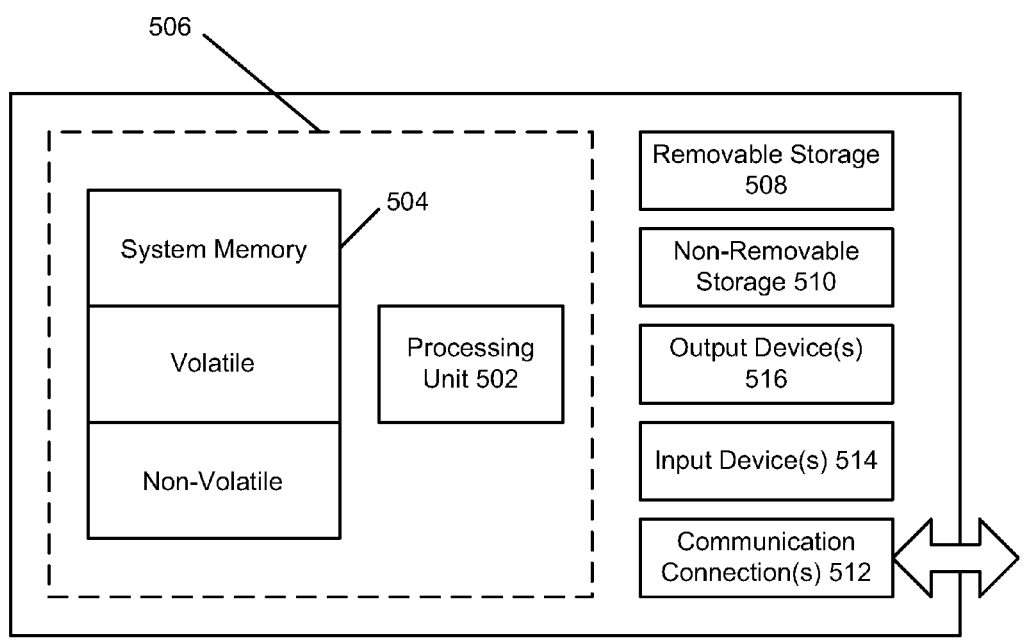
FIG. 5 shows an exemplary computing environment in which example implementations and aspects may be implemented.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a plurality of user account identifiers by a computing device;
   receiving a plurality of messages, wherein each message is associated with a user account and a time by the computing device;
   receiving a question by the computing device, wherein the question is associated with a time;
   determining a subset of the plurality of user account identifiers based on the messages associated with the user accounts, the times associated with the messages, the question, and the time associated with the question by the computing device; and
   providing the determined subset by the computing device.

2. The method of claim 1, further comprising:
   ranking the user account identifiers of the subset of the plurality of user account identifiers; and
   providing the determined subset according to the ranking.

3. The method of claim 1, wherein determining the subset of the plurality of user account identifiers based on the messages associated with the user accounts, the times associated with the messages, the question, and the time associated with the question comprises:
   determining one or more subjects associated with the question;
   determining one or more subjects associated with each of the user accounts based on the messages associated with each user account; and
   determining the subset of the plurality of user account identifiers based on the times associated with the messages, the question, the time associated with the question, the one or more subjects associated with each of the user accounts, and the one or more subjects associated with the question.

4. The method of claim 1, wherein determining the subset of the plurality of user account identifiers based on the messages associated with the user accounts, the times associated with the messages, the question, and the time associated with the question comprises:
   determining the time associated with the question;
   determining a probability that each of the identified user accounts is available at the determined time based on the times associated with the messages associated with each user account; and
   determining the subset of the plurality of user account identifiers based on the messages associated with the user accounts, the probability determined for each identified user account, and the question.

5. The method of claim 1, wherein each of the messages is associated with a location, and determining the subset of the plurality of user account identifiers based on the messages associated with the user accounts, the times associated with the messages, the question, and the time associated with the question comprises:
   determining a location associated with the question;
   determining a probable location for each identified user account at the time associated with the question based on the locations and times associated with the messages associated with each user account; and
   determining the subset of the plurality of user account identifiers based on the messages associated with the user accounts, the question, the location associated with the question, and the determined probable location for each identified user account.

6. The method of claim 1, wherein the question is associated with a user account identifier, and determining the subset of the plurality of user account identifiers based on the messages associated with the user accounts, the times associated with the messages, the question, and the time associated with the question comprises:
   determining a social affinity between the user account associated with the question and each of the user accounts associated with the messages; and
   determining the subset of the plurality of user account identifiers based on the messages associated with the user accounts, the times associated with the messages, the question, the time associated with the question, and the determined social affinity between the user account associated with the question and each of the user accounts associated with the messages.

7. The method of claim 1, further comprising:
   receiving an indication of selection of one or more of the user account identifiers in the determined subset; and
   providing the question to the user accounts associated with the one or more selected user account identifiers.

8. The method of claim 1, wherein the user account identifiers are identifiers of user accounts in one or more social networking applications.

9. A method comprising:
   receiving a plurality of messages by a computing device, wherein each message is associated with a user account of a plurality of user accounts and a time;
   generating a recommendation model based on the plurality of messages and the time associated with each message by the computing device;
   receiving a question by the computing device, wherein the question is associated with a time; and based on the received question, the time associated with the question, and the generated recommendation model, recommending one or more user accounts of the plurality of user accounts to answer the received question by the computing device.

10. The method of claim 9, wherein generating the recommendation model comprises:
determining one or more subjects of each message of the received plurality of messages; and
generating the recommendation model based on the determined one or more subjects, the plurality of messages, and the time associated with each message.

11. The method of claim 9, wherein generating the recommendation model comprises:
determining a location associated with each message of the plurality of received messages; and
generating the recommendation model based on the determined locations, the plurality of messages, and the time associated with each message.

12. The method of claim 9, wherein generating the recommendation model comprises:
determining a social affinity between a user account associated with the question and the user accounts associated with each message of the plurality of received messages; and
generating the recommendation model based on the determined affinities, the plurality of messages, and the time associated with each message.

13. The method of claim 9, wherein the user accounts are user account accounts in one or more social networking applications.

14. A system comprising:
a computing device;
a plurality of user account identifiers;
a plurality of messages, wherein each message is associated with a time and a user account identified by the plurality of user account identifiers; and
a recommendation engine adapted to:
generate one or more models based on the plurality of messages and the times associated with the messages of the plurality of messages;
receive a question, wherein the question is associated with a time;
determine a subset of a plurality of user account identifiers based on the one or more models, the received question, and the time associated with the received question; and
provide the determined subset.

15. The system of claim 14, wherein each message is associated with a location, and the recommendation engine is further adapted to:
generate the one or more models further based on the location, and the user account associated with each message;
determine a location associated with the received question; and
determine the subset of the plurality of user accounts based on the one or more models, the received question, and the time and location associated with the received question.

16. The system of claim 14, wherein the recommendation engine is further adapted to:
determine a social affinity between pairs of user accounts of the plurality of user accounts;
generate the one or more models further based on the determined social affinity between the pairs of user accounts;
determine a user account associated with the received question; and
determine the subset of the plurality of user accounts based on the one or more models, the received question, the time associated with the received question, and the user account associated with the received question.

17. The system of claim 14, wherein each message is associated with a subject, and the recommendation engine is further adapted to:
generate the one or more models further based on the subject associated with each message;
determine a subject associated with the received question; and
determine the subset of the plurality of user accounts based on the one or more models, the received question, the time associated with the received question, and the subject associated with the received question.

* * * * *